Inventors:
C.C. Halkyard and C. Cosgrove
By Emil Bönnelycke
Attorney

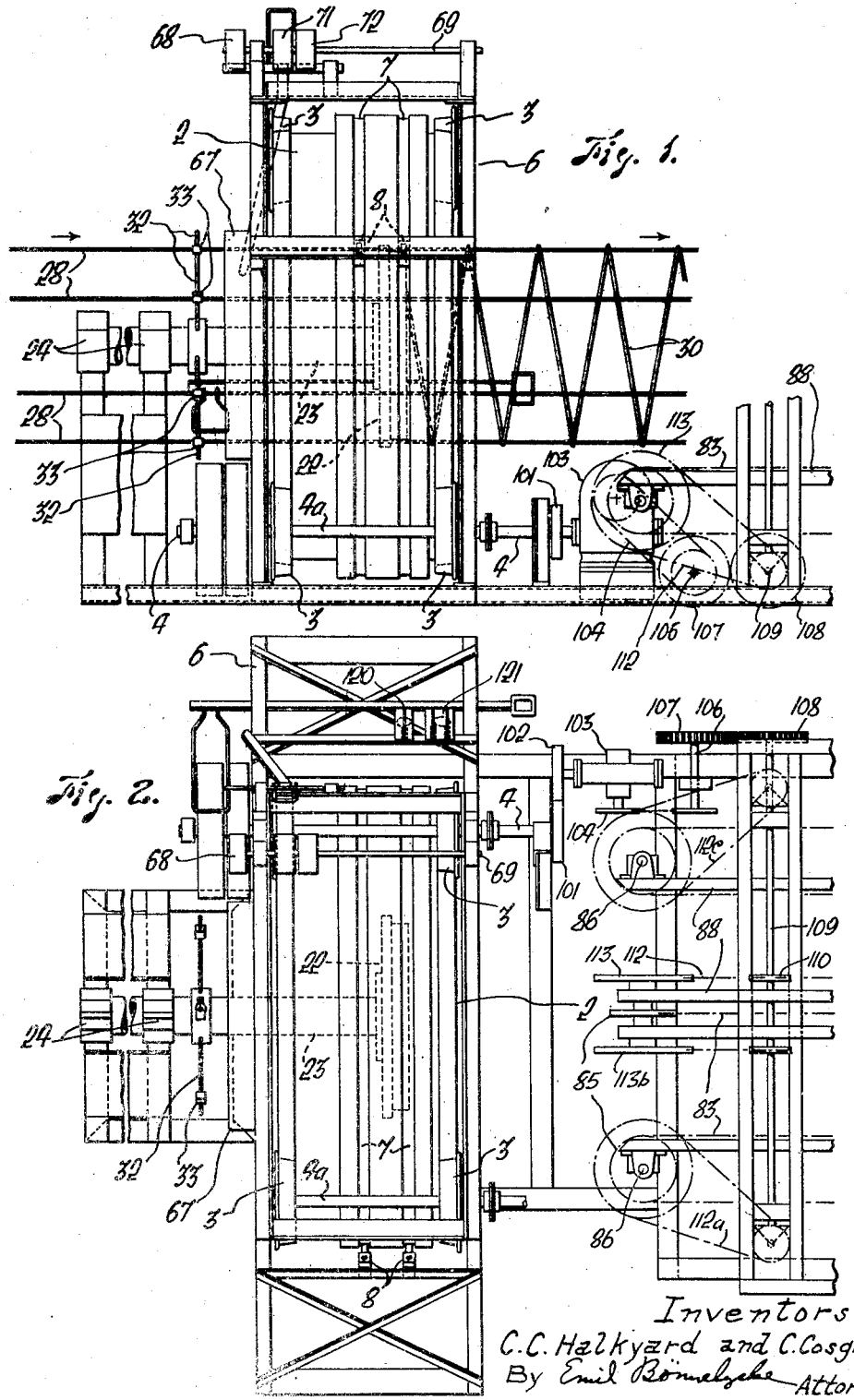

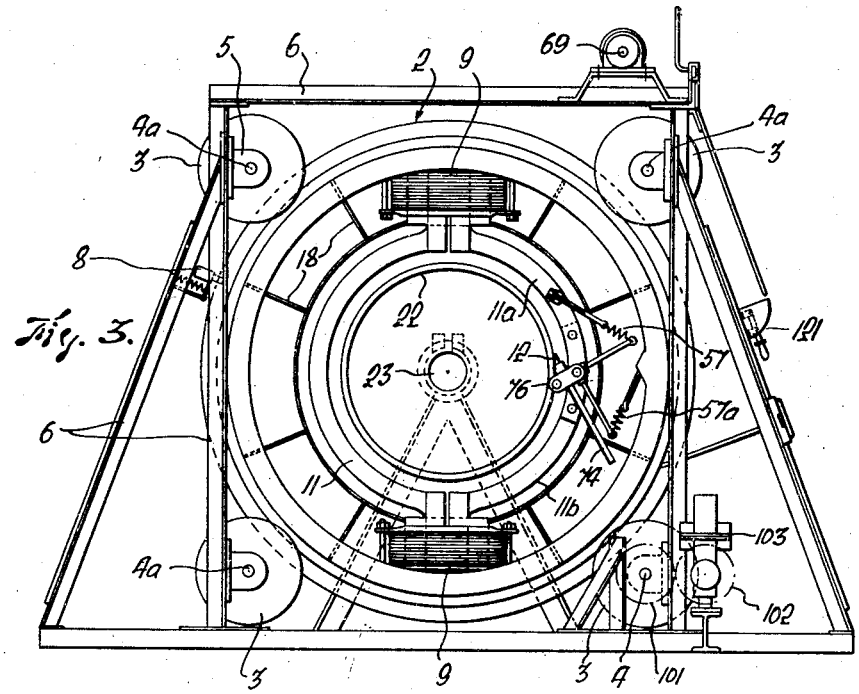
Fig. 3.
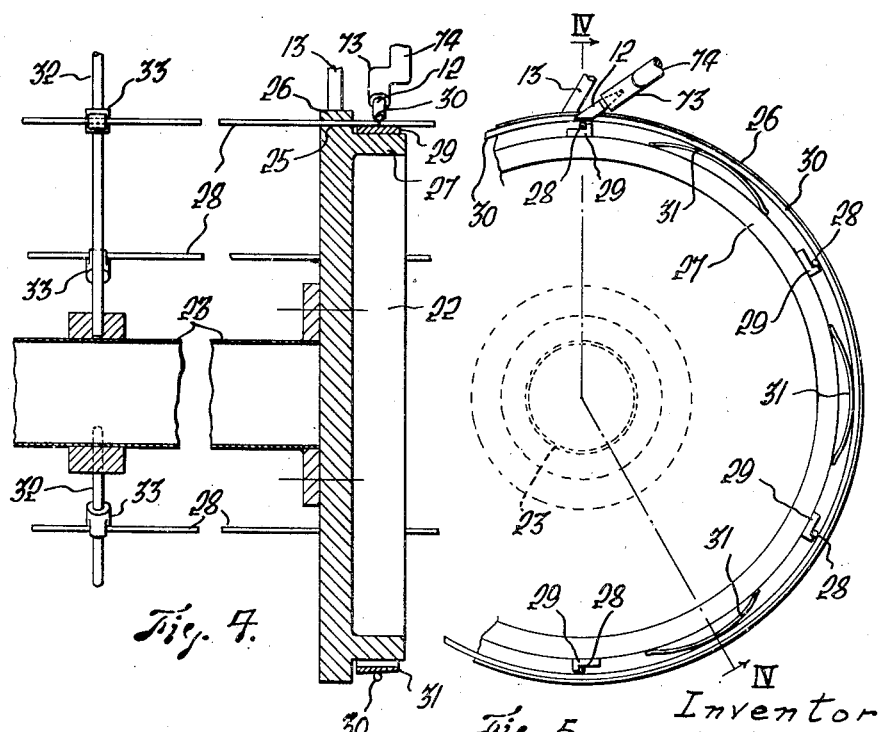
Fig. 4.
Fig. 5.
Inventors:
C. C. Halkyard and C. Cosgrove
By Emil Brinelyshe
Attorney

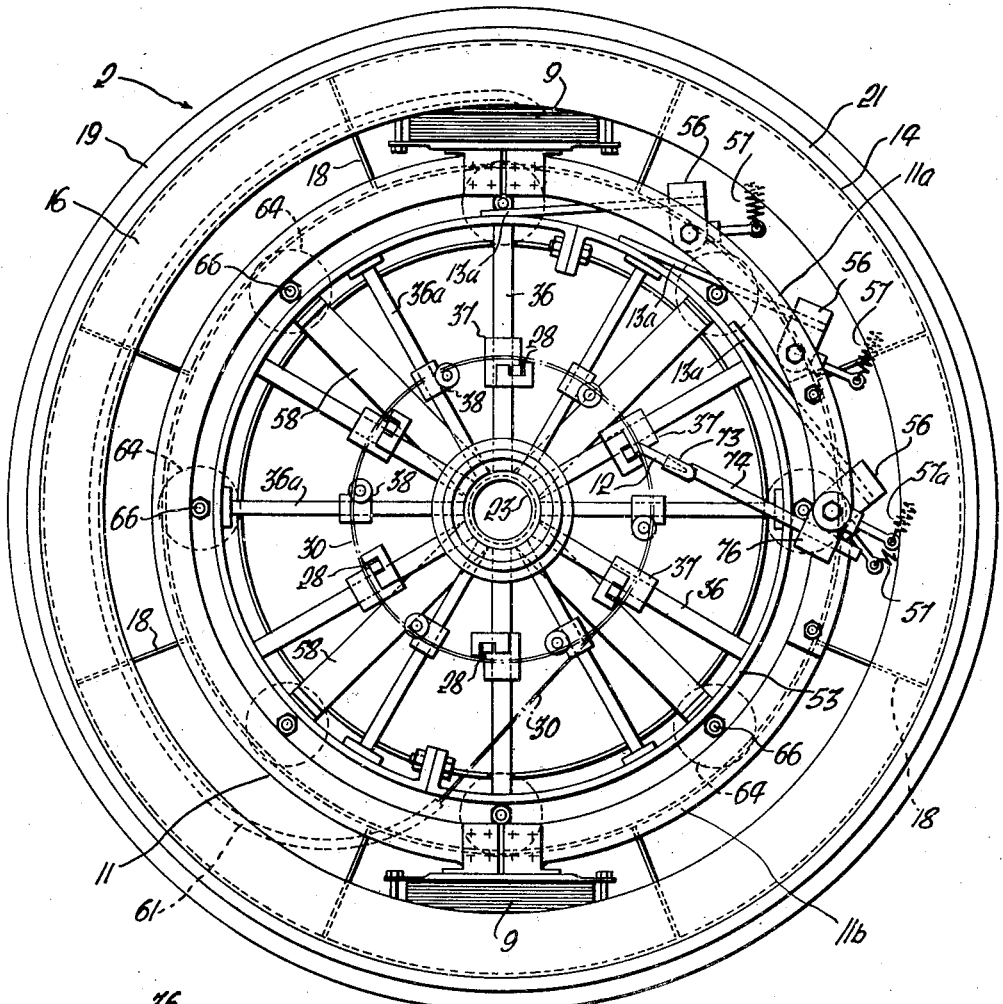
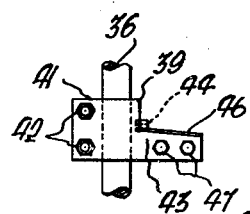
Fig. 8.
Fig. 9.
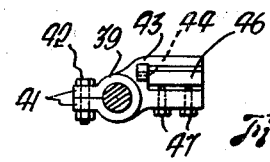
Fig. 10.
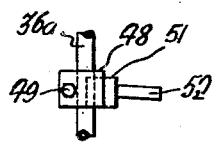
Fig. 11.
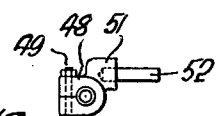
Fig. 12.
Inventors:
C. C. Halkyard and C. Cosgrove
By Emil Bonnelyke
Attorney Sept. 26, 1933. C. C. HALKYARD ET AL 1,928,534
MEANS FOR MANUFACTURING CONCRETE PIPE REENFORCEMENTS AND THE LIKE
Filed Aug. 3, 1931 6 Sheets-Sheet 5

Sept. 26, 1933.  C. C. HALKYARD ET AL  1,928,534
MEANS FOR MANUFACTURING CONCRETE PIPE REENFORCEMENTS AND THE LIKE
Filed Aug. 3, 1931  6 Sheets-Sheet 6

Inventors:
C. C. Halkyard and C. Cosgrove
By Emil Bonnelycke
Attorney

Patented Sept. 26, 1933

1,928,534

UNITED STATES PATENT OFFICE 1,928,534

MEANS FOR MANUFACTURING CONCRETE PIPE REENFORCEMENTS AND THE LIKE

Charles Cyril Halkyard, Melbourne, Victoria, and Claude Cosgrove, Malvern, Victoria, Australia, assignors to Hume Steel Limited, Melbourne, Victoria, Australia, a company of Victoria, Australia Application August 3, 1931, Serial No. 554,916, and in Australia August 12, 1930

15 Claims. (Cl. 219—4)

This invention relates to the manufacture of concrete pipe reenforcements and similar structures wherein longitudinal and circumferential wires or rods are welded together at their crossing points to thereby form a skeleton cage or network.

The present invention aims particularly at the production of tubular and like reenforcement by continuously feeding the longitudinal and circumferential wires or rods through an annular rotary welding head or drum as the skeleton structure is formed, the welding head or drum being adapted to successively weld together the longitudinal and circumferential wires or rods at their junctions or crossing points by the rotation of the welding head around the reenforcing cage or the like whilst the latter moves longitudinally but is otherwise stationary.

The invention comprises an annular welding drum adapted to be rotated about guiding means which maintain the longitudinal wires or members of the structure in desired spaced relationship as they are fed forwards through said drum and also provide rigid support for the longitudinal and circumferential wires at their intersections or welding points. A circumferential wire is wound around the forwardly moving longitudinals by the rotation of the drum which carries an inwardly projecting electrode adapted to automatically and successively weld the longitudinal and circumferential wires or members together at their intersections during the rotation of the drum and the feeding of the longitudinal and circumferential wires.

If desired two or more circumferential wires may be simultaneously fed in desired spaced relationship to the longitudinals, and provision made for simultaneously welding the intersections of each circumferential wire with the longitudinals. Such procedure obviously increases rate of output and is particularly beneficial when producing structures of relatively large diameter where it would not be practicable to increase output by increasing the speed of rotation of the welding drum or frame.

By the invention relatively long reenforcing cages or the like suitable for concrete piles, poles, pipes and other similar structures may be conveniently and economically constructed without the difficulties hitherto attendant on the manufacture of such structures.

The above and other objects, advantages and features of the invention will, however, be fully explained in the following description aided by the accompanying drawings illustrating one practical embodiment of the invention and in which—

Figure 1 is a side elevation of apparatus in accordance with the invention, omitting the means for feeding the longitudinal wires.

Figure 2 is a plan of Figure 1.

Figure 3 is an end view of Figure 1.

Figure 4 is an enlarged section of guiding means for the longitudinal wires, the section being taken on line IV—IV of Figure 5.

Figure 5 is a part end view of Figure 4.

Figure 8 is an end view of Figure 6.

Figures 9 and 10 are details of guide members for the longitudinal wires or members.

Figures 11 and 12 are detail views of guide members for the circumferential wires or members.

Figures 6, 7:
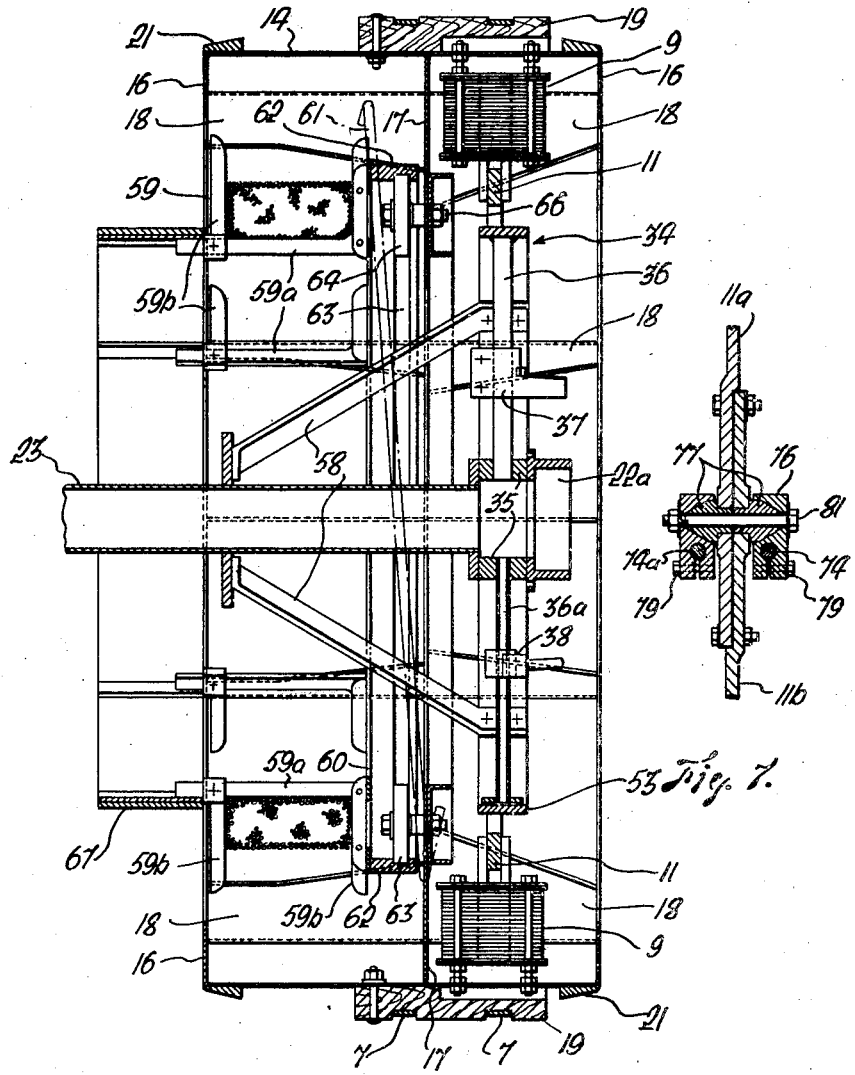
Figure 6 is an enlarged section through the rotary drum.
Figure 7 is a fragmentary sectional view of a current distributing ring and electrode holders mounted thereon.

Apparatus in accordance with the invention comprises a drum or annular frame indicated in general by the reference numeral 2. This drum is rotated about a horizontal axis and for this purpose may be supported and rotated by sets of rollers 3 mounted on shafts 4, 4a, supported by bearings 5 on a framework 6.

Around the exterior of the frame are slip rings 7 engaged by brushes 8 by which the primary electric current is received.

The rotary drum also carries one or more transformers 9, one or more pairs of such transformers being preferably provided and arranged in diametrically opposite positions on the drum to ensure proper balance. The secondary windings of the transformers are connected to one or more current distributing rings 11 which may be formed in halves and rotate with the drum. To each ring is connected a welding electrode 12 and one or more slip ring electrodes 13 or brushes 13a as will be hereinafter referred to.

A current distributing ring 11 and a welding electrode 12 are provided for each circumferential wire, but in the drawings only one circumferential wire is illustrated; therefore only one ring 11 and one electrode 12 are shown.

A suitable construction for the drum is illustrated more clearly in Figures 6 and 8 according to which the drum is built up of sheet metal and has an outer circular wall 14 with side flanges 16, an intermediate annular flange 17 and a number of radial gussets 18. The aforesaid slip rings 7 may be secured within circumferential recesses formed in wooden battens 19 secured to the exterior of the circular wall of the drum. Tapered rings 21 may be provided at each side or end of the drum to form tracks for the supporting and rotating rollers 3.

Means for guiding the longitudinal wires through the drum and for supporting the longitudinal and circumferential wires at their intersections or welding zones are provided within the drum. According to Figures 1 to 5 such means includes a mandrel or guide ring 22 detachably applied to a stationary beam or tube 23 which extends into the drum and is supported by brackets 24 outside of the drum. The outer periphery of the ring 22 is preferably stepped to form flanges 26, 27, of major and minor diameters (see Figures 4 and 5). The major flange is disposed nearer to the inlet side of the drum and is provided with appropriately spaced holes 25 through which the longitudinal wires 28 extend. The wires 28 are preferably fed or drawn through the drum, as hereinafter described, from supply coils or spools (not shown) rotatably mounted in any suitable position. The minor flange 27 of the guide ring may be provided with stepped pieces 29 aligned with said guide holes 25 and providing rigid supports for the longitudinal wires where they are crossed by the circumferential wire 30.

Each circumferential wire is fed by means hereinafter described, at an appropriate angle to the longitudinal wires where they rest on said supports 29 so that as the longitudinal wires are fed forwards through the guide ring each circumferential wire will be wound around the longitudinal wires. Between adjacent pairs of said stepped supports 29 shaping members 31 of bowed or other suitable form may be arranged in order to prevent sagging of the circumferential wire between the supports 29 and to ensure that the circumferential wire will have the desired curvature.

The shaping members 31 should be insulated from the guide ring, or they may be of insulatory material. They should also preferably be tapered towards the outlet or discharge side of the drum as shown in Figure 4 in order to facilitate the circumferential wire riding off same as operations proceed.

The guide ring may be detached from the beam 23 and replaced by a larger or smaller ring when it is desired to produce structures of different diameters.

If desired an adjustable guiding device for the longitudinal wires may be arranged between the longitudinal wire coils and the adjacent or inlet side of the rotary drum, and such device may include a number of rods 32 radiating from the beam 23, each rod having an apertured guide piece 33 capable of longitudinal adjustment thereon.

An alternative form of guiding means for the longitudinal wires or members which enables infinite radial adjustment of the wires is illustrated in Figures 6 and 8 to 12. According thereto a wheel 34 is stationarily mounted upon the end of said beam 23 within the rotary drum, the wheel having a hub 35 with spokes 36 along which guide members 37 are radially adjustable. Guides or shaping members 38 for the circumferential wire may also be radially adjustable on spokes 36a between the guide members 37.

The guide members 37 also provide support for the longitudinal and circumferential wires at their intersections or welding points and are seen more clearly in Figures 9 and 10. Each guide member 37 may comprise a longitudinally split collar 39 (Figures 9 and 10) having lugs 41 to receive the bolts 42 whereby the guide member may be clamped in any desired position to its spoke. Another lug 43 of the guide member has an aperture 44 for the respective longitudinal wire and may be recessed in alignment with said aperture to receive a wearing strip 46 which may be detachably held in position by screws 47. The upper surface of said wearing strip is preferably inclined as shown to facilitate the circumferential wire riding off same as the structure is being built up.

The shaping members 38 for the circumferential wire may each comprise a split collar 48 (Figures 11 and 12) adapted to be clamped to their spokes 36a by bolts 49 and having a lug 51 from which outstands a pin 52 which is inclined similarly to the wearing strip 46 of the guide member 37 and for a like purpose.

A guide member 22a similar to that illustrated in Figures 3 and 5 may be applied to the hub 35 of wheel 34 for guiding and supporting the longitudinal and circumferential wires when producing structures of too small diameter to allow of the guide members 37 and shaping members 38 being brought into use.

The rim 53 of wheel 34 is engaged by one or more brushes 13a projecting from holders 56 pivotally connected to the aforesaid current distributing ring 11 and having associated spring means as at 57 whereby the brushes, while carried round with the drum, are held in close contact with the rim 53.

In cases where the wheel rim 53 is formed in two sections as shown in Figure 8 it may be advisable to provide three of said brushes 13a and holders and to space them so that throughout rotation of the drum each half of the rim will be engaged by at least one brush.

The wheel spokes 36a and the bars 58 extending from the beam 23 to the wheel rim 53 should be insulated from the latter.

Each circumferential wire may be fed to the longitudinals from a rotary spool 59 located within the interior of the drum by way of a guide tube 61 so that as the longitudinals are fed through the drum the rotation of the spool causes the circumferential wire to be wound around the longitudinals. The spool 59 is rotatable independently of the drum and for this purpose the spool may be attached to a ring 62 provided with a race or track 63 for rollers 64 mounted on spindles 66 fixed to the rotary drum. These rollers are preferably mounted on ball or other bearings on spindles 66 to minimize friction.

The spool is illustrated as being composed of a number of circumferentially spaced horizontal bars 59a secured to a plate 60 attached to said ring 62, and having outstanding arms 59b at each end. The spool may, however, be of any other suitable construction.

In order to replenish the spool with wire it may be provided with a pulley 67 located outside the drum to receive a driving belt (not shown) passing around a pulley 68 on a shaft 69 having fast and loose pulleys 71, 72, thereon, whereby upon operation of pulley 67 wire may be transferred from a supply coil (not shown) to the spool 59.

The welding electrode 12 is preferably of copper and has its tip grooved as in Figures 4 and 5 so that it may track over the circumferential wire. The electrode may have a Morse taper at its other end so that it may fit into a socket 73 at one end of a rod 74, the socket being preferably cranked or offset while the rod is capable of being turned and adjusted lengthwise in its holder 76 (see Figures 3, 7 and 8) to thereby permit of adjustment of the positioning of the electrode.

The holder 76 may have spring means 57a in order to press the electrode against the circumferential wire 30.

In Figures 4 and 5, a slip ring electrode 13 is shown in sliding or wiping contact with the periphery of flange 26 of guide ring 22 so that as each intersection of the longitudinal and circumferential wires is approached by the electrodes the local portions of the wires will be preheated before the weld is actually made.

Figure 7 illustrates a means of connecting the welding electrode 12 and the slip ring electrode 13 to the current distributing ring 11 and according thereto the respective half of ring 11 is in two sections 11a, 11b, which are overlapped and are insulated from each other. The overlapped portions are drilled to receive two oppositely directed conical members 77 which fit into corresponding recesses formed in holders 76 in which the electrodes 12 and 13, or rods 74, 74a, carrying the electrodes are clamped by screws 79. The conical members 77 and the holders have co-aligned passages through which extends a bolt 81 for retaining the holders in position. This bolt should be insulated from the holders and conical members. It will be evident that by slackening the bolt 81 the holders may be adjusted to thereby vary the inclination of the electrodes according to the diameter of the reenforcement to be produced.

The brushes 13a illustrated in Figure 8 take the place of the slip ring electrode 13 and provide for preheating of the intersecting zones of the wires to be welded.

Figure 13:
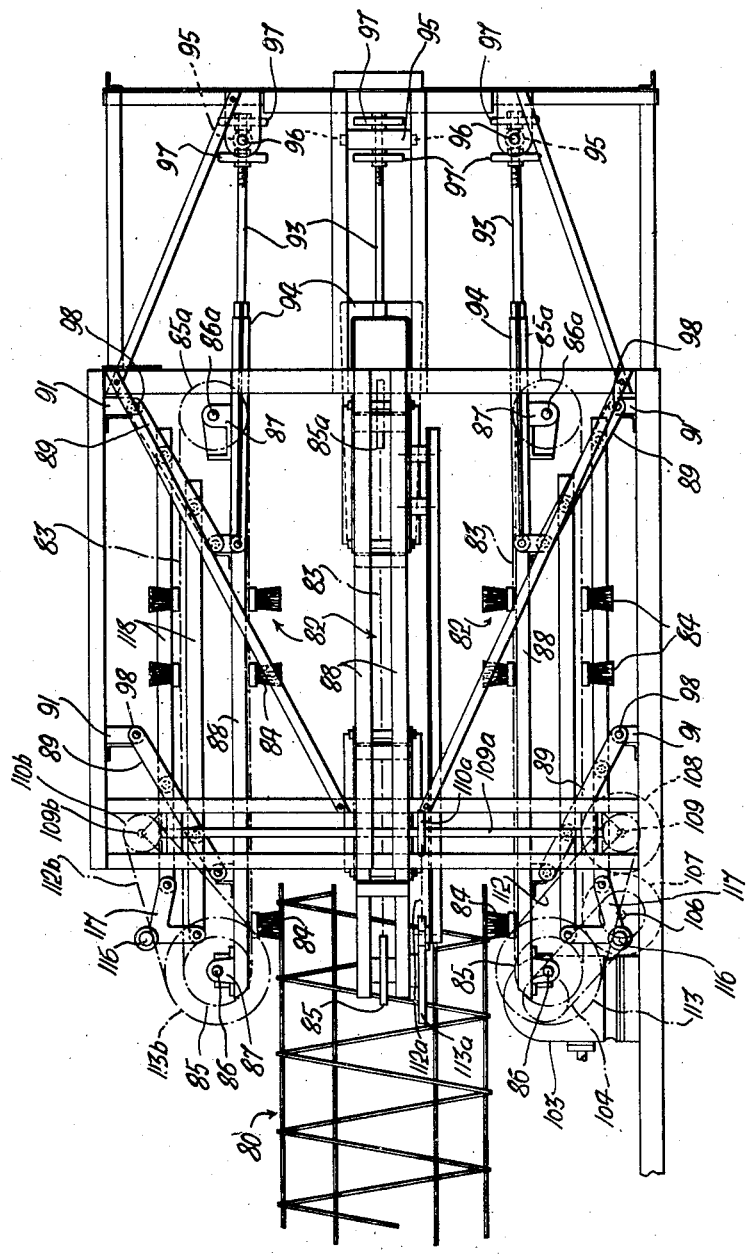
Figure 13 is a side elevation of means for feeding the longitudinal wires to the rotary welder and for carrying the completed reinforcement or like structure away therefrom.
Figure 14:
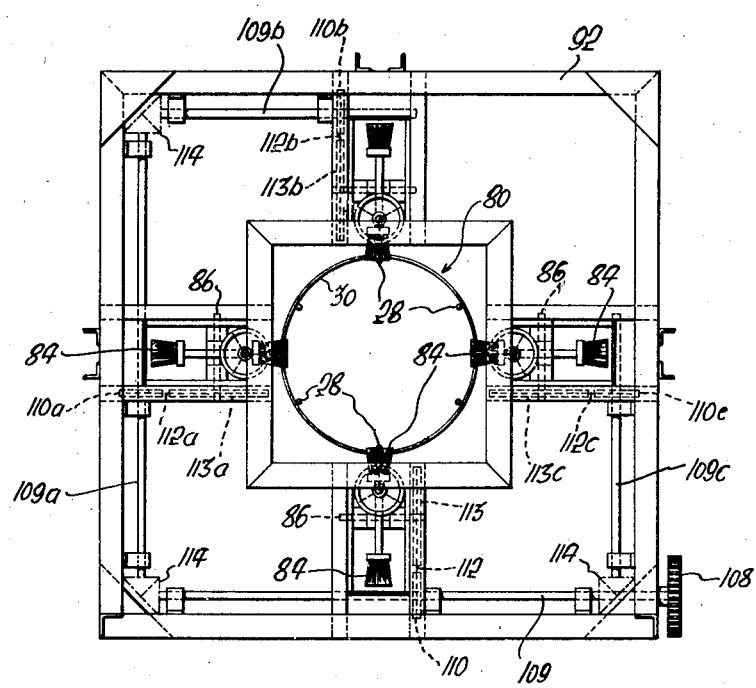
Figure 14 is an end view of Figure 13.

Any suitable means may be provided for feeding the longitudinal wires 28 but it is preferred that they be drawn through the drum 2 by feeding means which engage the welded structure 80 and conduct it away from the rotary drum. Figures 13 and 14 and the right hand portions of Figure 1 and 2 illustrate feeding means operating in this manner and including a number of conveyors 82 (four being shown) extending longitudinally of the reenforcement or like structure issuing from the welding apparatus and spaced circumferentially around the structure.

Each conveyor may consist of one or more endless belts or chains 83 provided at regular intervals with a series of metallic bristled brushes 84 into which the wires of the structure 80 penetrate with the result that the structure is carried along by the moving brushes.

Provision is made for bodily and individually adjusting the conveyors to suit the diameter or size of the structure being produced and such adjustment may be effected without interrupting the drive to the conveyors. For this purpose sprocket wheels 85, 85a, for each of the endless conveyor chains may be mounted on shafts 86, 86a, supported by bearings 87 on bars 88 connected by pairs of parallel links 89 to brackets 91 on a suitable framework 92.

An adjusting rod 93 is provided for each conveyor and may have at one end a fork 94 which is connected to a pair of the links 89. The other end of each rod 93 is screw threaded to pass through a nut 95 having trunnions 96 whereby it may oscillate. Encircling rod 93 at each side of the oscillatory nut 95 are adjusting nuts 97 which are normally tight against the nut 95 but may be adjusted to thereby extend or retract rod 93 and thus swing the conveyor bodily about the pivots 98 connecting the links 89 to brackets 91.

The conveyors may be driven through any suitable gearing from a main shaft 4 upon which one of said sets of supporting and driving rollers 3 of the drum are mounted. For instance, said shaft 4 may be connected by toothed gears 101, 102, to worm reduction gearing 103 having a chain drive 104 to shaft 106 geared by wheels 107, 108 to shaft 109 carrying a sprocket 110 which transmits the drive by a chain 112 to a sprocket 113 on the driving shaft 86 of one of the conveyors. The drive may be transmitted from shaft 109 to the other conveyors by mitre gearing 114, shafts 109a, b and c, sprockets 110a, b and c, chains 112a, b and c and sprockets 113a, b and c.

The centres of the shafts 86 and the shafts 109, 109a, b and c should be so arranged relative to the pivots at the ends of the links 89 that the entire conveyors may be swung bodily by the links without affecting the chain drives 112, 112a, 112b and 112c.

If desired the respective chains 112, 112a, b and c may have associated therewith a jockey 116 carried by a bell crank lever 117 connected at its ends to parallel bars 118 attached to the links 89.

In carrying out operations the longitudinal wires 28 may be initially fed by hand through the guide ring 22 or the guide members 37 and the leading ends of the wires attached to a bar (not shown) which may be temporarily connected to the chains 83 of the conveyors at the end nearer the drum 2. Each circumferential wire 30 is then led from its spool 59 through the tube 61 at the desired angle around the exterior of the longitudinal wires. The electrode 12 is then placed upon the circumferential wire and the drum 2 is rotated preferably at a comparatively slow rate at first. A starting switch 120 may be closed and opened intermittently during such comparatively slow rotations of the drum to effect the welding of the first intersections of the wires. When a complete convolution of the circumferential wire 30 has been welded to the longitudinals the normal speed of operation may be attained and a main switch 121 closed so that feeding and guiding of the longitudinal and circumferential wires and the welding together of their intersections proceeds automatically, thus ensuring a continuous delivery of the welded structure which may be severed as desired into the desired lengths.

An adjustable trestle or table (not shown) may be provided to receive the welded structure from the conveyors 82.

The driving means for the drum may include variable speed mechanism whereby a substantially constant welding speed may be obtained for producing reenforcement or like structures of different diameters.

In some cases, particularly when it is desired to produce structures of relatively large diameter, provision may be made for simultaneously feeding two or more circumferential wires in suitably spaced relationship to the longitudinals and arranging for the intersections of each circumferential wire with the longitudinal wires to be simultaneously welded, such provision obviously increasing the rate of output and rendering manufacture even more economical. Provision may also be made for adjusting the pitch or spacing of the circumferential wires, for instance, by adjustably mounting the feeding or guiding means of said wires.

Each circumferential wire may be fed from a spool and having appropriate feeding and guiding means as before indicated while a welding electrode 12 and a current distributing ring 11 as beforementioned would be provided for each circumferential wire. The transformers 9 may also be duplicated but a single guide ring 22 or wheel 34 with an electrode 13 or brushes 13a may be sufficient to provide a return path for the welding current.

It will be understood that in addition to circular reenforcing cages or the like, similar structures of elliptical, rectangular and other shapes may be formed in any desired lengths by appropriate selection or adjustment of the guiding means for the longitudinal and/or the circumferential wires.

Having now described our invention what we claim as new and desire to secure by Letters Patent is—

1. Apparatus for manufacturing concrete pipe reenforcement and such like structures having longitudinal wires or members and circumferential or helical wires or members which are welded together at their intersections, comprising in combination an annular welding frame or drum, a welding electrode carried by said drum, means for rotating said drum, means for feeding said longitudinal wires through the drum, means for guiding said longitudinal wires, means for feeding circumferential wire to said longitudinal wires so that it is helically wound around the exterior thereof, and means within said drum for supporting said longitudinal and circumferential wires at their intersections which are successively welded together by said electrode as the drum rotates about the structure formed and the feeding of the wire proceeds.

2. Apparatus for manufacturing concrete pipe reenforcement and such like structures having longitudinal wires or members and circumferential wires or members which are welded together at their intersections, comprising in combination, an annular welding frame, means for rotating said frame, means for feeding longitudinal wires in spaced relationship through said frame, means for simultaneously feeding a plurality of circumferential wires in spaced relationship to said longitudinal wires whereby said circumferential wires are wound helically around the exterior of said longitudinal wires, means for supporting said longitudinal and circumferential wires at their intersections, and a welding electrode for each circumferential wire carried by and rotating with said frame, each electrode tracking along a circumferential wire and adapted to weld the intersections of the longitudinal and circumferential wires.

3. Apparatus for manufacturing concrete pipe reenforcement and such like structures having longitudinal wires or members and circumferential wires or members which are welded together at their intersections, comprising in combination an annular welding frame, means for rotating said frame, a transformer adapted to receive primary current attached to the frame and having its secondary windings connected to a current distributing ring which rotates with said frame, a welding electrode connected to said ring so as to rotate therewith, means for feeding longitudinal wires in spaced relationship through said frame, means for feeding a circumferential wire to said longitudinals, whereby it is wound helically around the exterior thereof, and means for guiding said longitudinal and circumferential wires and providing supports for their intersections, said welding electrode tracking along said circumferential wire.

4. Apparatus according to claim 3, including a stationary member electrically connected to said supports for the longitudinal and circumferential wires and having a circular contact face, and a second electrode connected to said current distributing ring and adapted to make sliding contact with said contact face to provide for preheating of the intersecting portions of the wires before each weld takes place.

5. Apparatus for manufacturing concrete pipe reenforcement and such like structures having longitudinal wires or members and circumferential wires or members which are welded together at their intersections, comprising in combination, an annular welding frame, means for rotating said frame, means for feeding said longitudinal wires through the frame, means for feeding circumferential wire to said longitudinal wires, means within said frame for guiding said longitudinal wires and providing supports for the intersecting portions of said longitudinal and circumferential wires, and a welding electrode mounted on said frame and adapted to track along said circumferential wire, whereby said intersections are welded together successively during rotation of said frame and the feeding of said longitudinal and circumferential wires, said means for guiding said longitudinal wires comprising a member adapted to be stationarily mounted within said frame, and having circumferentially spaced guide apertures for said wires and supporting faces adjacent said apertures to support said longitudinal and circumferential wires where they intersect.

6. Apparatus for manufacturing concrete pipe reenforcement and such like structures having longitudinal wires or members and circumferential wires or members which are welded together at their intersections, comprising in combination, an annular welding frame, means for rotating said frame, means for feeding said longitudinal wires through the frame, means for feeding circumferential wire to said longitudinal wires, means within said frame for guiding said longitudinal wires and providing supports for the intersecting portions of said longitudinal and circumferential wires, and a welding electrode mounted on said frame and adapted to track along said circumferential wire, whereby said intersections are welded together successively during rotation of said frame and the feeding of said longitudinal and circumferential wires, said means for guiding said longitudinal wires comprising a member with spokes stationarily mounted within the frame, and guide members longitudinally adjustable one on each spoke, said guide members providing supports for the intersecting portions of said longitudinal and circumferential wires.

7. Apparatus for manufacturing concrete pipe reenforcement and such like structures having longitudinal wires or members and circumferential wires or members which are welded together at their intersections, comprising in combination, an annular welding frame, means for rotating said frame, means for feeding said longitudinal wires through the frame, means for feeding circumferential wire to said longitudinal wires, means within said frame for guiding said longitudinal wires and providing supports for the intersecting portions of said longitudinal and circumferential wires, and a welding electrode mounted on said frame and adapted to track along said circumferential wire, whereby said intersections are welded together successively during rotation of said frame and the feeding of said longitudinal and circumferential wires, said means for guiding said circumferential wire around the longitudinal wires comprising a member with spokes stationarily mounted within the frame, and guide members longitudinally adjustable one on each spoke.

8. In apparatus of the character described, a rotary drum or annular frame, a transformer adapted to receive primary electric current attached to the drum, a current distributing ring connected to the transformer so as to rotate with the drum, a wheel stationarily mounted within said ring and having spokes, guide members for longitudinal and circumferential wires adjustable radially on said spokes, means for feeding longitudinal wires through said guide members, means actuated by the rotation of said drum for winding wire helically around said longitudinals, a welding electrode, a holder therefor mounted on said current distributing ring, and means for maintaining said electrode in contact with said helical wire.

9. In apparatus of the character described, the combination with the parts claimed in claim 8, of a rim on said wheel, and a brush connected to said distributing ring and adapted to contact with said rim.

10. Apparatus according to claim 8, wherein said electrode holder is pivotally mounted on said ring and has spring means associated therewith to maintain the electrode in close contact with the said helical wire.

11. Apparatus according to claim 8, wherein said electrode is held by a rod adjustable lengthwise in said holder, which is pivotally mounted on said ring and has associated spring means to maintain the electrode in close contact with said helical wire.

12. Apparatus according to claim 1, wherein the means for feeding each circumferential wire comprises a spool concentrically mounted within said frame so that it may rotate independently of the frame, and a curved guide tube located within the frame.

13. Apparatus according to claim 1, wherein the means for feeding the longitudinal wires comprises means which engage the welded structure being formed and draw it away from the frame.

14. In an apparatus of the character described feeding means according to claim 1, wherein the means for feeding the longitudinal wires comprises a plurality of conveyors provided with means for engaging the welded structure being formed and drawing it away from the frame and including a main frame, a number of sub-frames, one for each conveyor, means including parallel links for connecting each sub-frame to the main frame, whereby each sub-frame with its conveyor may be bodily adjusted, and means for retaining said sub-frames in their adjusted positions.

15. In apparatus of the character described, feeding means for the longitudinal wires comprising a number of conveyors extending longitudinally of the tubular welded structure issuing from the delivery side of the apparatus, said conveyors being spaced circumferentially about the tubular welded structures and having gripping members adapted to engage the structure to thereby draw it away from the apparatus so that the longitudinal wires are fed in tensioned condition to the apparatus, said conveyors being adjustably mounted on a frame so that they may be moved bodily inwards and outwards in substantially radial directions to and from the axis of the tubular welded structure.

CHARLES CYRIL HALKYARD.
CLAUDE COSGROVE.